April 21, 1970 YOSHIYUKI SHIMIZU 3,507,556
TELESCOPE LENS OF REFLECTING-REFRACTIVE TYPE
Filed Oct. 20, 1966
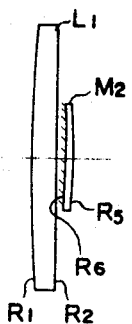
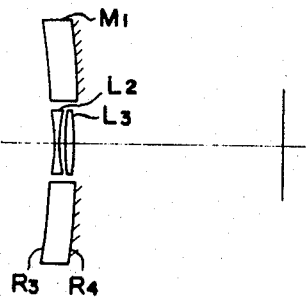
FIG. 1
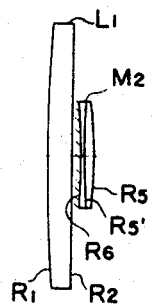
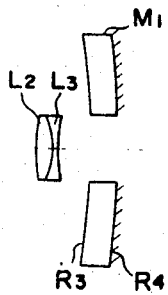
FIG. 2
FIG. 3
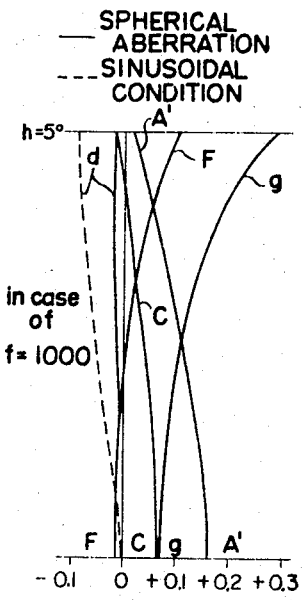
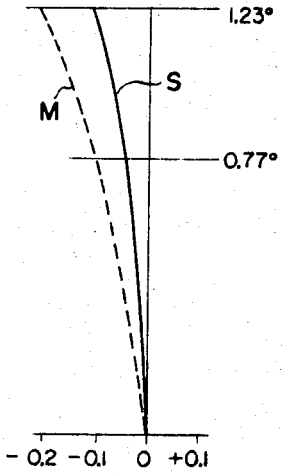
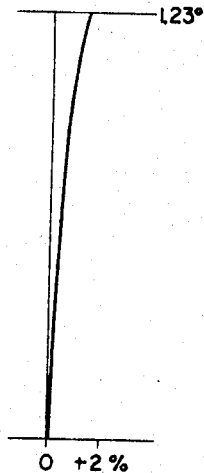

United States Patent Office 3,507,556
Patented Apr. 21, 1970

3,507,556
TELESCOPE LENS OF REFLECTING-REFRACTIVE TYPE
Yoshiyuki Shimizu, Tokyo, Japan, assignor to Nippon Kogaku K.K., Tokyo, Japan, represented by Hiroshi Shirahama, a corporation of Japan
Filed Oct. 20, 1966, Ser. No. 588,213
Claims priority, application Japan, Oct. 22, 1965, 40/64,422
Int. Cl. G02b 17/08
U.S. Cl. 350—201       3 Claims

ABSTRACT OF THE DISCLOSURE

A telescope lens of the reflecting-refractive type is disclosed wherein the total length is reduced to approximately one fourth of the focal length. A reflecting mirror of sufficient convergence and a lens of suitable magnification are provided to form an image of excellent quality with a minimum of aberrations, a Mangin mirror being provided having a refractive index of 1.5 and a ratio of radius of curvature of the back reflecting surface to that of the front surface is approximately 1.5.

---

This invention relates to a telescope lens and more particularly to a telescope lens of reflecting refractive type.

It has been known that chromatic aberration is reduced and the total length is shortened by making use of reflecting optical system in a camera lens of long focal point and the object lens for telescope. In accordance with the conventional reflecting refractive optical system as has been reported as a camera lens, the total length is about one third of the focal length in the case of a short lens; and the diameter of the auxiliary mirror being quite large, often being greater than fifty percent of the effective diameter. In accordance with the conventional reflecting refractive optical system, the deterioration of image has resulted from diffraction.

It is therefore the object of the present invention to present a reflecting refractive optical system in which the total length thereof is about one fourth of the focal length and the diameter of the auxiliary mirror is restricted to about forty percent of the effective diameter.

Another object of the present invention is to present a small and light reflecting refractive optical system in which various aberrations are preferably corrected.

In accordance with the present invention, it provides a telescope lens of reflecting refractive type which comprises having a positive single lens, a first reflecting mirror with the reversal surface thereof being concave, a second reflecting mirror with the reversal surface thereof being convex and placed near the positive single lens, and two negative and positive lenses placed near the first reflecting mirror; the composite focal length of the last mentioned two negative and positive lenses being negative; the radius of curvature $R_1$ of the surface of the positive single lens toward the object and the radius of curvature $R_2$ of the surface of the positive single lens toward the image having the relation of $5R_1 < |R_2|$; the radii of curvature of the refractive surface $R_3$ and reflecting surface $R_4$ of the first reflecting mirror having the relation of $$1.35 < \frac{R_4}{R_3} < 1.75$$

and the radii of curvature of the refractive surface $R_5$ and reflecting surface $R_6$ of the second reflecting mirror having the relation of $$1.3 < \frac{R_6}{R_5} < 2.0$$

and $0.2f < |R_6| < 0.7f$.

The present invention will be more apparent from the following explanation referring to the embodiments shown in the accompanied drawing in which:

FIG. 1 is a cross section of the lens system of the embodiment 1 of the present invention;
FIG. 2 is a cross section of the lens system of the embodiment 2 of the present invention; and
FIG. 3 is a diagram showing aberration curves observed with respect to embodiment 1.

The optical system of this invention is composed, in the order observed from the direction in which light rays are coming, of a positive single lens $L_1$ with the surface having large refractive power directed against the object space; a first reflecting mirror $M_1$ with the reversal surface thereof being concave and the radius of curvature of the light refracting surface thereof having an absolute value smaller than the radius of curvature of the surface reflecting light rays; a second reflecting mirror $M_2$ whose reversal surface is convex and the radius of curvature of the light refracting surface close to $L_1$ having an absolute value smaller than the radius of curvature of the light reflecting surface (said reflecting mirror $M_2$ may be prepared by adhering the two lenses) and a lens assembly of positive and negative lenses (or of negative and positive lenses) $L_2$ and $L_3$ which are placed close to $M_1$ with the two lenses placed adjacent to each other, or adhered against each other.

The optical system in accordance with the present invention can correct chromatic aberration to be smaller in spite of the fact that the reverse side reflecting mirror is used, and is characterized in that the image point on the axis of the respective wave lengths from A′ line to g line can be controlled within $\frac{2}{10,000}$ of the focal length.

There is a relation as is given below, between the radius of curvature of the surface where the light is coming in, and the radius of curvature of the surface where the light is coming out of the positive single lens $L_1$ $$5R_1 < |R_2|$$

This relation is almost like the condition for preferably correcting the spherical aberration and sinusoidal condition of the lens $L_1$ as the positive single lens, but in the present invention both the spherical aberration and sinusoidal condition of the latter optical system are preferably corrected and therefore it can be directly applied as the condition of $L_1$.

It is necessary to keep the radii of curvatures $R_3$ and $R_4$ of the refractive surface and reflecting surface of the first mirror $M_1$ to be in the following relation;

$$1.35 < \frac{R_4}{R_3} < 1.75$$

As this ratio becomes smaller than 1.35 or larger than 1.75, the amount of spherical aberration and sinusoidal condition becomes larger, and at the same time, the balance is broken, and the image by the mirror $M_1$ becomes poor, and it is impossible to carry out the sufficient enlargement of the image by the mirror $M_2$. Namely, said condition is an indispensable condition for keeping the image produced by the mirror $M_1$ to be sufficiently excellent, and for obtaining the greater enlargement magnification by the mirror $M_2$ and for making the whole optical system into a compact form.

Between the surfaces $R_5$ and $R_6$ of the second mirror $M_2$ for coming in and out, respectively, of the light there is the following relations;

$$1.3 < \frac{R_6}{R_5} < 2.0, \quad 0.2f < |R_6| < 0.7f$$

These relations are the conditions for forming image by magnifying the same while keeping the image excellently formed by $M_2$ to be excellent, and when the ratio of the former condition goes beyond the predetermined range, the spherical aberration and sinusoidal condition are deteriorated mainly and it is at least impossible to expect for excellent optical system of the final image. The latter condition determines the magnified ratio of $M_2$ and when $|R_6|$ is smaller than $0.2f$, the magnifying ratio becomes too big, and the deterioration of image is brought about, and when it is larger than $0.7f$, the diameter of $M_2$ becomes too big, and at the same time the load imported on the groups of lenses $L_2$ and $L_3$ following the second mirror $M_2$ becomes too big, and as a result thereof the deterioration of image is necessitated. In regard to the last group of lenses $L_2$ and $L_3$, the composite focal length is in the negative, but this mainly corrects the curving of the image in the negative direction as is caused by the lens $L_1$ and mirror $M_2$ turned to the positve direction to keep the final image excellent.

The optical system of this invention has a total length of about one fourth of the focal length as will be shown by the embodiments hereinafter disclosed. This is achieved due mainly to the sufficient convergence of the light rays by the reflecting mirror $M_1$ and the sufficient enlargement of the image formed by the lens $L_1$ and mirror $M_1$. In other words, mirror $M_1$ must form an excellent image of an object located at a sufficiently long distance, while mirror $M_2$ must form an excellent image of an object located at a short distance and an image located at a long distance. These facts show that both mirrors $M_1$ and $M_2$ must have significant brightness compared to the F number of the whole system and that it is possible to make the effective diameter of the mirror $M_2$ much smaller than that of the mirror $M_1$.

An image formed through the lens $L_1$ and mirror $M_1$ must be sufficiently excellent, since any aberration remaining in this image is increased in proportion to the square of magnification rate as the image is enlarged by the mirror $M_2$. On the other hand, even though the image formed by the lens $L_1$ and mirror $M_1$ is excellent, if there is an aberration remaining in the mirror $M_2$, this remaining aberration is increased in proportion to the square of the magnification rate, so that it is necessary to correct the aberration of the mirror $M_2$. The so-called Mangin mirror has been known as one in which the spherical aberration may be excellently corrected relative to an object point at infinity. This mirror is a spherical, back surface reflecting mirror, and when a glass material having a refractive index of 1.5 is used, the spherical aberration is best corrected when the ratio of radius of curvature of the back reflecting surface to that of the front refractive surface is about 1.5. The Mangin mirror is a concave surface mirror having a real focal point. This fact is also true for a convex surface mirror and this is included in the conditions for the radii of curvature of the mirrors $M_1$ and $M_2$ of the embodiments of the present invention, namely:

$$1.35 < \frac{R_4}{R_3} < 1.75$$

$$1.3 < \frac{R_6}{R_5} < 2.0$$

However, the best combination of the radii of curvature of the back and front surfaces of a Mangin mirror cannot be applicable for the correction of the sinusoidal condition. Consequently, if excellency is desired also for the image out of the optical axis, the condition in which the spherical aberration is best corrected is not always desired.

However, in case when $R_4/R_3$ and/or $R_6/R_5$ are/is beyond the lower or upper limit, both the spherical aberration and sinusoidal condition are increased so that the significance of the use of a back reflecting mirror is largely reduced.

The condition of $0.2f < |R_6| < 0.7f$ aims at reducing the focal length of the mirror $M_2$ relative to the focal length of the whole system. This condition also aims at increasing the magnification rate of enlarging the image formed by the mirrors $M_1$ and $M_2$ which results in the reduction of the size of the whole optical system. When $|R_6|$ exceeds its upper limit, it is advantageous to correct the aberration but it is not advantageous to reduce the size of the optical system. On the other hand, when $|R_6|$ exceeds its lower limit, it is advantageous to reduce the size of the system but not advantageous for correcting aberration since the magnification rate by the mirror $M_2$ is increased too much.

The following are the embodiments of the present invention, and in embodiment 1 and embodiment 2 various aberrations are corrected with $d$ line as the base, and in embodiment 3, A′ line is made to be the base and calculations are made in regard to $d$ line and $c$ line, and this is to satisfy the object thereof as the telescope lens wherein infrared ray is used.

EMBODIMENT 1

$[f = 1{,}000.0]$

| | | | | |
|---|---|---|---|---|
| $L_1$ | $R_1 = +682.000$ <br> $R_2 = \infty$ | Thickness=10 | $n_d = 1.51823$ | $\nu_d = 59.0$ |

Interval between $L_1$ and $M_1 = 155$

| | | | | |
|---|---|---|---|---|
| $M_1$ | $R_3 = -319.000$ <br> $R_4 = -485.185$ | Thickness=10 | $n_d = 1.54072$ | $\nu_d = 47.2$ |

Interval between $M_1$ and $M_2 = 147$

| | | | | |
|---|---|---|---|---|
| $M_2$ | $R_5 = -169.430$ <br> $R_6 = -258.420$ | Thickness=3.3 | $n_d = 1.54814$ | $\nu_d = 45.9$ |

Interval between $M_2$ and $L_2 = 150$

| | | | | |
|---|---|---|---|---|
| $L_2$ | $r_7 = -200.000$ <br> $r_8 = +69.200$ | Thickness=1.7 | $n_d = 1.5168$ | $\nu_d = 64.2$ |

Interval between $L_2$ and $L_3 = 2.0$

| | | | | |
|---|---|---|---|---|
| $L_3$ | $r_9 = +600.000$ <br> $r_{10} = -321.860$ | Thickness=2.4 | $n_d = 1.74077$ | $\nu_d = 27.7$ |

EMBODIMENT 2

$[f = 1{,}000.0]$

| | | | | |
|---|---|---|---|---|
| $L_1$ | $R_1 = +536.350$ <br> $R_2 = \infty$ | Thickness=1.20 | $n_d = 1.62041$ | $\nu_d = 60.3$ |

Interval between $L_1$ and $M_1 = 146.0$

| | | | | |
|---|---|---|---|---|
| $M_1$ | $R_3 = -340.545$ <br> $R_4 = -543.546$ | Thickness=10.5 | $n_d = 1.54072$ | $\nu_d = 47.2$ |

Interval between $M_1$ and $M_2 = 137.0$

| | | | | |
|---|---|---|---|---|
| $M_2$ | $R_5 = -181.189$ | Thickness=3.5 | $n_d = 1.58913$ | $\nu_d = 61.2$ |
| | $R_5' = +1{,}100.000$ <br> $R_6 = -290.000$ | Thickness=3.0 | $n_d = 1.59270$ | $\nu_d = 35.8$ |

Interval between $M_2$ and $L_2 = 121.5$

| | | | | |
|---|---|---|---|---|
| $L_2$ | $R_7 = +300.000$ <br> $R_8 = -32.636$ | Thickness=6.0 | $n_d = 1.67270$ | $\nu_d = 32.2$ |
| $L_3$ | $R_9 = +71.537$ | Thickness=2.0 | $n_d = 1.72000$ | $\nu_d = 50.3$ |

EMBODIMENT 3

[$f=3,000.0$ (calculated by A' line, C line, d line)]

| | | | | |
|---|---|---|---|---|
| $L_1$ | $R_1=+3,740.000$<br>$R_2=\infty$ | Thickness=30.0 | $nA'=1.58028$ | $n_c=1.58495$<br>$n_d=1.58921$ |

Interval between $L_1$ and $M_1=574.0$

| | | | | |
|---|---|---|---|---|
| $M_1$ | $R_3=-978.000$<br>$R_4=1,532.000$ | Thickness=30.0 | $nA'=1.51522$ | $n_c=1.51823$<br>$n_d=1.5208$ |

Interval between $M_1$ and $M_2=550$

| | | | | |
|---|---|---|---|---|
| $M_2$ | $R_5=-48.000$<br>$R_6=-803.125$ | Thickness=10 | $nA'=1.51250$ | $n_c=1.51554$<br>$n_d=1.51823$ |

Interval between $M_2$ and $L_2=450.0$

| | | | | |
|---|---|---|---|---|
| $L_2$ | $R_7=-900.0$<br>$R_8=+180.0$ | Thickness=5 | $nA'$ 1.61368 | $n_c$ 1.61728<br>$n_d=1.62041$ |

Interval between $L_2$ and $L_3=5$

| | | | | |
|---|---|---|---|---|
| $L_3$ | $R_9=+280.000$<br>$R_{10}=+1,162.300$ | Thickness=5 | $nA'=1.70278$ | $n_c=1.71032$<br>$n_d=1.71736$ |

Seidel aberration coefficients of Embodiment 1 are shown in the table below.

In accordance with the present invention, as described in the foregoing, it is possible to remarkably shorten the total length by making use of the reflecting optical system to the objective lens for telescope and camera lens of long focal point. When surface reflecting mirror is used as the reflecting mirror, the chromatic aberration is not brought about at all by the reflecting mirror, but on the contrary, it is difficult to carry out the correction of the sinusoidal condition. On the other hand, in case the reverse surface reflecting mirror is used, the spherical aberration is excellently corrected by the reflecting mirror by itself, and at the same time the respective aberrations can be excellently corrected as a whole, and it is possible to make the whole lens system into a compact form, but on the contrary bad chromatic aberration is brought about by the reflecting mirror and in case infrared ray photograph is taken as in the case of long focal point camera lens wherein the correction of chromatic aberration should need be carried out up to A' line, it is not advantageous by any means when compared with the case where surface reflecting mirror is used. However, in this invention, this problem is almost solved. In other words, in accordance with this invention it is possible to restrict the chromatic aberration of image point on the axis of the respective wave lengths from $g$ line to A' line within $2/10,000$ of the focal length. At the same time the total length of the optical system of this invention is about one fourth of the focal length, and for example, the optical system having $l$ m. of focal length is shortened to be about 25 cm. in all, and it is especially advantageous when said optical system is used as the camera lens having such a long local length.

What is claimed is:

1. A catadioptric telephoto lens system comprising a positive lens, a rear-surface spherical first mirror positioned behind said positive lens and constituted by a negative meniscus lens, the reverse surface of said first mirror being concave, a rear surface spherical second mirror placed near the rear surface of said positive lens and constituted by a positive meniscus lens, the reverse surface of said second mirror being convex, and a diverging lens group placed near said first mirror, and having the following parameters:

[$f=1,000.0$]

| | | | | |
|---|---|---|---|---|
| $L_1$ | $R_1=+682.000$<br>$R_2=\infty$ | Thickness=10 | $n_d=1.51823$ | $\nu_d=59.0$ |

Interval between $L_1$ and $M_1=155$

| | | | | |
|---|---|---|---|---|
| $M_1$ | $R_3=-319.000$<br>$R_4=-485.185$ | Thickness=10 | $n_d=1.54072$ | $\nu_d=47.2$ |

Interval between $M_1$ and $M_2=147$

| | | | | |
|---|---|---|---|---|
| $M_2$ | $R_5=-169.430$<br>$R_6=-258.420$ | Thickness=3.3 | $n_d=1.54814$ | $\nu_d=45.9$ |

Interval between $M_2$ and $L_2=150$

| | | | | |
|---|---|---|---|---|
| $L_2$ | $r_7=200.000$<br>$r_8=+69.200$ | Thickness=1.7 | $n_d=1.5168$ | $\nu_d=64.2$ |

Interval between $L_2$ and $L_3=2.0$

| | | | | |
|---|---|---|---|---|
| $L_3$ | $r_9=+600.000$<br>$r_{10}=-321.860$ | Thickness=2.4 | $n_d=1.74077$ | $\nu_d=27.7$ | wherein R is the radius of curvature, $n_d$ is the refractive power for the $d$ line, and $\nu_d$ is the dispersive power.

In case $f$ is set to be 1.0

| | I | II | III-IV | IV | V |
|---|---|---|---|---|---|
| 1 | +0.7087518 | −0.0907202 | +0.0232242 | +0.5121080 | −0.0655498 |
| 2 | +0.2471600 | −0.5254666 | +2.2343032 | +1.1170516 | −2.3750844 |
| 3 | −11.5206954 | +10.9515292 | −20.8209642 | −11.5106476 | +10.9419778 |
| 4 | +8.9601700 | −10.4291834 | +24.2780814 | +9.4625574 | −11.0139370 |
| 5 | +0.6953272 | −1.4859114 | +6.3507740 | +2.0752214 | −4.4347402 |
| 6 | −1.0341119 | +2.2561916 | −9.8449718 | −2.8323820 | +6.1795990 |
| 7 | −3.6380482 | +4.5912580 | −11.5884392 | −0.7947118 | +1.0029354 |
| 8 | +5.9920192 | −5.4168786 | +9.7938858 | +6.9870466 | −6.3163990 |
| 9 | −0.4050486 | +0.1744948 | −0.1503446 | −1.7787588 | +0.7662888 |
| 10 | +0.0034062 | +0.0770544 | +3.4860974 | −3.1806116 | −71.9485950 |
| 11 | −0.0114168 | +0.1748962 | −5.3585140 | −1.9070210 | +30.1780000 |
| 12 | +0.1083476 | −0.3765662 | +2.6175332 | +2.6307348 | −9.1431942 |
| Σ | +0.1058612 | −0.0993024 | +1.0206654 | +0.7176870 | −56.2286986 |

2. A catadioptric telephoto lens system comprising a positive lens, a rear-surface spherical first mirror positioned behind said positive lens and constituted by a negative meniscus lens, the reverse surface of said first mirror being concave, a rear surface spherical second mirror placed near the rear surface of said positive lens and constituted by a positive meniscus lens, the reverse surface of said second mirror being convex, and a diverging lens group placed near said first mirror, and having the following parameters:

[$f=1,000.0$]

| | | | | |
|---|---|---|---|---|
| $L_1$ | $R_1=+536.350$<br>$R_2=\infty$ | Thickness=1.20 | $n_d=1.62041$ | $\nu_d=60.3$ |

Interval between $L_1$ and $M_1=146.0$

| | | | | |
|---|---|---|---|---|
| $M_1$ | $R_3=-340.545$<br>$R_4=-543.546$ | Thickness=10.5 | $n_d=1.54072$ | $\nu_d=47.2$ |

Interval between $M_1$ and $M_2=137.0$

| | | | | |
|---|---|---|---|---|
| $M_2$ | $R_5=-181.189$<br>$R_5'=+1,100.000$<br>$R_6=-290.000$ | Thickness=3.5<br>Thickness=3.0 | $n_d=1.58913$<br>$n_d=1.59270$ | $\nu_d=61.2$<br>$\nu_d=35.8$ |

Interval between $M_2$ and $L_2=121.5$

| | | | | |
|---|---|---|---|---|
| $L_2$<br>$L_3$ | $R_7=+300.000$<br>$R_8=-32.636$<br>$R_9=+71.537$ | Thickness=6.0<br>Thickness=2.0 | $n_d=1.67270$<br>$n_d=1.72000$ | $\nu_d=32.2$<br>$\nu_d=50.3$ | wherein R is the radius of curvature, $n_d$ is the refractive power for the $d$ line, and $\nu_d$ is the dispersive power.

3. A catadioptric telephoto lens system comprising a positive lens, a rear-surface spherical first mirror positioned behind said positive lens and constituted by a negative meniscus lens, the reverse surface of said first mirror being concave, a rear surface spherical second mirror placed near the rear surface of said positive lens and constituted by a positive meniscus lens, the reverse surface of said second mirror being convex, and a diverging lens group placed near said first mirror, and having the following parameters:

[$f=3,000.0$ (calculated by A' line, C line, $d$ line)]

| | | | | |
|---|---|---|---|---|
| $L_1$ | $R_1=+3,740.000$<br>$R_2=\infty$ | Thickness=30.0 | $nA'=1.58028$ | $n_c=1.58495$<br>$n_d=1.58921$ |

Interval between $L_1$ and $M_1=574.0$

| | | | | |
|---|---|---|---|---|
| $M_1$ | $R_3=-978.000$<br>$R_4=1,532.000$ | Thickness=30.0 | $nA'=1.51522$ | $n_c=1.51823$<br>$n_d=1.52088$ |

Interval between $M_1$ and $M_2=550$

| | | | | |
|---|---|---|---|---|
| $M_2$ | $R_5=-480.000$<br>$R_6=-803.125$ | Thickness=10 | $nA'=1.51250$ | $n_c=1.51554$<br>$n_d=1.51823$ |

Interval between $M_2$ and $L_2=450.0$

| | | | | |
|---|---|---|---|---|
| $L_2$ | $R_7=-900.0$<br>$R_8=+180.0$ | Thickness=5 | $nA'=1.61368$ | $n_c=1.61728$<br>$n_d=1.62041$ |

Interval between $L_2$ and $L_3=5$

| | | | | |
|---|---|---|---|---|
| $L_3$ | $R_9=+280.000$<br>$R_{10}=+1,162.300$ | Thickness=5 | $nA'=1.70278$ | $n_c=1.71032$<br>$n_d=1.71736$ |

References Cited

UNITED STATES PATENTS 2,701,983  2/1955  Back et al. _____ 350—199
3,285,128  11/1966 Schlegel _____ 350—201

FOREIGN PATENTS 936,424  12/1955  Germany.

JOHN K. CORBIN, Primary Examiner